United States Patent
Chen et al.

(10) Patent No.: US 12,423,497 B2
(45) Date of Patent: Sep. 23, 2025

(54) LAYOUT REPAIRING METHOD AND APPARATUS, COMPUTER DEVICE, AND STORAGE MEDIUM

(71) Applicant: CHANGXIN MEMORY TECHNOLOGIES, INC., Hefei (CN)

(72) Inventors: Chuanjiang Chen, Hefei (CN); Kang Zhao, Hefei (CN); Li Bai, Hefei (CN); Li Tang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 673 days.

(21) Appl. No.: 17/807,757

(22) Filed: Jun. 20, 2022

(65) Prior Publication Data

US 2023/0061135 A1   Mar. 2, 2023

(30) Foreign Application Priority Data

Sep. 2, 2021   (CN) .......................... 202111026862.8

(51) Int. Cl.
*G06F 30/392* (2020.01)
*G06F 30/394* (2020.01)
*G06F 30/398* (2020.01)
G06F 119/06 (2020.01)
G06F 119/18 (2020.01)
(Continued)

(52) U.S. Cl.
CPC .......... *G06F 30/392* (2020.01); *G06F 30/394* (2020.01); *G06F 30/398* (2020.01); *G06F 2119/06* (2020.01); *G06F 2119/18* (2020.01); *H01L 23/5283* (2013.01)

(58) Field of Classification Search
CPC .  H01L 23/5283; G06F 30/392; G06F 30/394; G06F 30/398; G06F 2119/18; G06F 2119/06
USPC ........... 716/122, 129, 130, 133, 135; 703/14
See application file for complete search history.

(56) References Cited

U.S. PATENT DOCUMENTS 7,676,772 B1 *   3/2010   Nakagawa .............. G06F 30/39
                                                                716/135
8,418,117 B2 *   4/2013   Chen ....................... G06F 30/39
                                                                716/132

(Continued)

FOREIGN PATENT DOCUMENTS

CN        109002566 A  * 12/2018  ........... G06F 30/392
CN        110991139 A      4/2020
(Continued)

*Primary Examiner* — Phallaka Kik
(74) *Attorney, Agent, or Firm* — Kilpatrick Townsend & Stockton LLP

(57) ABSTRACT

The present disclosure relates to a layout repairing method and apparatus, a computer device, and a storage medium. The method includes: obtaining an initial layout of a semiconductor integrated circuit, wherein a metal connection line is formed on the initial layout; forming a power fill grid on the initial layout, wherein the power fill grid includes a slotted hole that overlaps orthographic projection of the metal connection line on the power fill grid, and the slotted hole includes a first section overlapping the metal connection line and at least one second section staggered with the metal connection line; and increasing area of the second section if the area of the second section is less than a lower threshold, to form a repaired layout.

15 Claims, 9 Drawing Sheets

(51) Int. Cl.
*H01L 23/52* (2006.01)
*H01L 23/528* (2006.01)

(56) References Cited

U.S. PATENT DOCUMENTS

| | | | |
|---|---|---|---|
| 2010/0037197 A1* | 2/2010 | Fukunaga | G06F 30/39 716/126 |
| 2011/0072405 A1* | 3/2011 | Chen | G06F 30/39 716/119 |
| 2011/0239178 A1* | 9/2011 | Yamashita | G06F 30/394 716/122 |
| 2016/0327856 A1* | 11/2016 | Jeong | G03F 1/70 |
| 2022/0308439 A1* | 9/2022 | Tien | G03F 1/70 |

FOREIGN PATENT DOCUMENTS

| | | | | | |
|---|---|---|---|---|---|
| JP | 2010021187 | A | * | 1/2010 | ......... G06F 17/5068 |
| JP | 2011018179 | A | * | 1/2011 | |
| KR | 20160099488 | A | * | 8/2016 | |
| TW | 1588595 | B | * | 6/2017 | |

* cited by examiner

LAYOUT REPAIRING METHOD AND APPARATUS, COMPUTER DEVICE, AND STORAGE MEDIUM

CROSS-REFERENCE TO RELATED APPLICATION

This application claims the priority of Chinese Patent Application No. 202111026862.8, submitted to the Chinese Intellectual Property Office on Sep. 2, 2021, the disclosure of which is incorporated herein in its entirety by reference.

TECHNICAL FIELD

The present application relates to the technical field of semiconductor manufacturing, and in particular, to a layout repairing method and apparatus, a computer device, and a storage medium.

BACKGROUND

With the rapid development of integrated circuit technologies, there is an increasingly high requirement for an integration degree of a semiconductor product. The integration of the semiconductor product requires a smaller size of a single semiconductor device and a smaller width of a single conductive wire in the semiconductor device, resulting in a larger resistance value of the conductive wire. In addition, a supply voltage of a chip continues to decrease, making a voltage drop effect of the chip more obvious.

Further, a serious voltage drop effect slows down a switching speed of a semiconductor switch transistor, increases power consumption of the semiconductor device, and affects overall performance and reliability of the semiconductor device.

SUMMARY

A first aspect of the present application provides a method of repairing a layout, inducing:

obtaining an initial layout of a semiconductor integrated circuit, wherein a metal connection line is formed on the initial layout;

forming a power fill grid on the initial layout, wherein the power fill grid includes a slotted hole that overlaps orthographic projection of the metal connection line on the power fill grid, and the slotted hole includes a first section overlapping the metal connection line and at least one second section staggered with the metal connection line; and increasing area of the second section if the area of the second section is less than a lower threshold, to form a repaired layout.

A second aspect of the present application provides a layout repairing apparatus, including:

one or more processors; and a storage apparatus, configured to store one or more programs, wherein the one or more programs, when executed by the one or more processors, cause the one or more processors to execute operations of:

obtaining an initial layout of a semiconductor integrated circuit, wherein a metal connection line is formed on the initial layout; forming a power fill grid on the initial layout, is wherein the power fill grid includes a slotted hole that overlaps orthographic projection of the metal connection line on the power fill grid, and the slotted hole comprises a first section overlapping the metal connection line and at least one second section staggered with the metal connection line; and increasing area of the second section if the area of the second section is less than a lower threshold, to form a repaired layout.

A third aspect of the present application provides a computer-readable storage medium. The computer-readable storage medium stores a computer program, and the computer program is executed by a processor to implement the method according to any one of the items described above.

BRIEF DESCRIPTION OF THE DRAWINGS

To describe the technical solutions in the embodiments of the present application more clearly, the accompanying drawings required to describe the embodiments are briefly described below. Apparently, the accompanying drawings described below are only some embodiments of the present application. A person of ordinary skill in the art may further obtain accompanying drawings of other embodiments based on these accompanying drawings without creative efforts.

FIG. 4a, FIG. 4b, FIG. 4c, FIG. 4d, and FIG. 5 schematically illustrate top views of initial layouts obtained in step S130 according to different embodiments of the present application;

DETAILED DESCRIPTION

Figure 1:
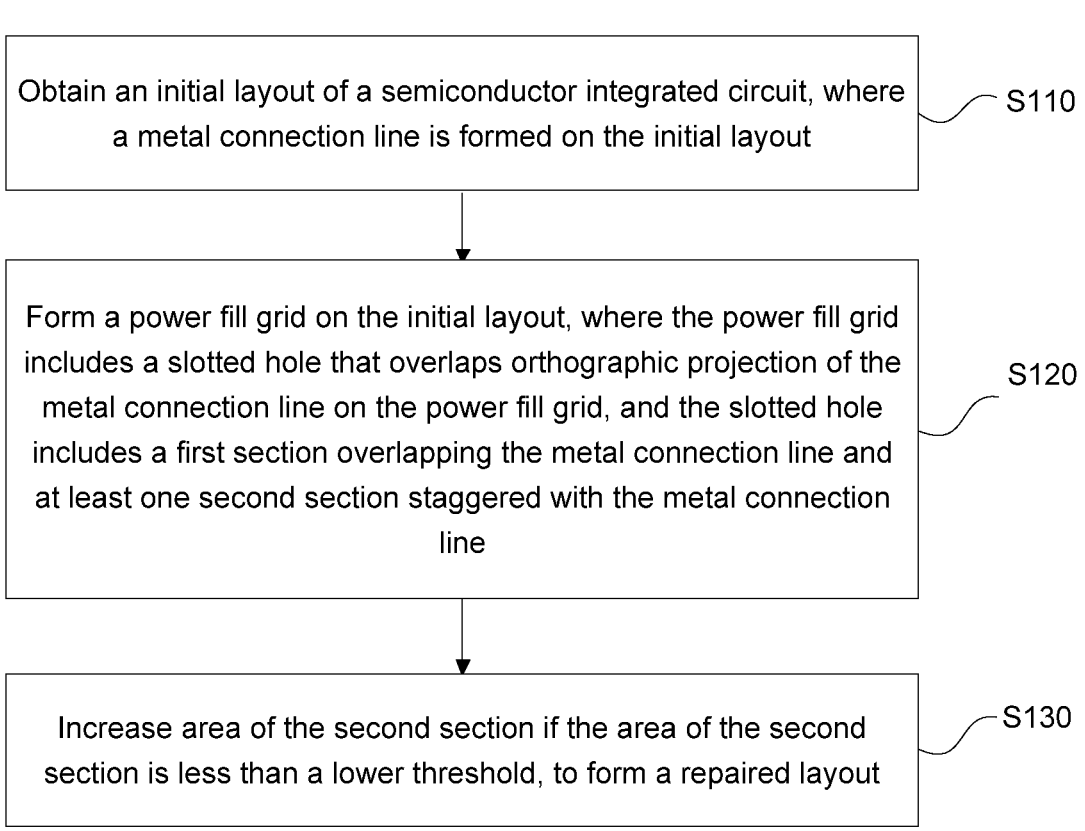
FIG. 1 is a flowchart of a method of repairing a layout according to an embodiment of the present application.

To facilitate the understanding of the present application, the present application is described more completely below with reference to related accompanying drawings. Preferred embodiments of the present application are shown in the accompanying drawings. However, the present application may be embodied in various forms without being limited to the embodiments described herein. On the contrary, these embodiments are provided to make the present application more thorough and comprehensive.

Unless otherwise defined, all technical and scientific terms used herein have the same meaning as commonly understood by those skilled in the technical field of the present application. The terms used in the specification of the present application are merely for the purpose of describing specific embodiments, rather than to limit the present application.

It should be understood that when an element or a layer is described as "being on", "being adjacent to", "being connected to" or "being coupled to" another element or layer, it can be on, adjacent to, connected to, or coupled to the another element or layer directly, or intervening elements or layers may be present. On the contrary, when an element is described as "being directly on", "being directly adjacent to", "being directly connected to" or "being directly coupled to" another element or layer, there are no intervening elements or layers. It should be understood that terms such as "first", "second", and "third" may be used to describe various elements, components, regions, layers, doping types and/or sections, but these elements, components, regions, layers, doping types and/or sections should not be limited by these terms. These terms are only used to distinguish one element, component, region, layer, doping type or section from another element, is component, region, layer, doping type or section. Therefore, without departing from the teachings of the present application, a first element, component, region, layer, doping type or section discussed below may be a second element, component, region, layer, doping type or section. For example, the first doping type may be the second doping type, and similarly, the second doping type may be the first doping type; or the first doping type and the second doping type are different doping types, for example, the first doping type may be P-type and the second doping type may be N-type, or the first doping type may be N-type and the second doping type may be P-type.

Spatial relationship terms such as "under", "beneath", "lower", "below", "above", and "upper" can be used herein to describe the relationship shown in the figure between one element or feature and another element or feature. It should be understood that in addition to the orientations shown in the figure, the spatial relationship terms further include different orientations of used and operated devices. For example, if a device in the accompanying drawings is turned over, and described as being "beneath another element", "below it", or "under it", the device or feature is oriented "on" the another element or feature. Therefore, the exemplary terms "beneath" and "under" may include two orientations of above and below. In addition, the device may be otherwise oriented (for example, rotated by 90 degrees or other orientations), and the spatial description used herein is interpreted accordingly.

In this specification, the singular forms of "a", "an" and "the/this" may also include plural forms, unless clearly indicated otherwise. It should also be understood that terms "include" and/or "comprise", when used in this specification, determine the presence of features, integers, steps, operations, elements and/or components, but do not exclude the presence or addition of one or more other features, integers, steps, operations, elements, components and/or groups. In addition, in this specification, the term "and/or" includes any and all combinations of related listed items.

The embodiments of the present application are described herein with reference to cross-sectional views as schematic diagrams of the ideal embodiments (and intermediate structures) of the present application. In this way, changes of the shown shape due to, for example, the manufacturing technology and/or tolerances can be expected. Therefore, the embodiments of the present application should not be limited to the specific shapes is of the regions shown herein, but include shape deviations due to, for example, the manufacturing technology. For example, an injection region displayed as a rectangle usually has a circular or curved feature and/or injection concentration gradient at an edge of the region, rather than a binary change from the injection region to a non-injection region. Similarly, a buried region formed by injection can lead to some injection in a region between the buried region and a surface through which the injection is carried out. Therefore, the regions shown in the figure are schematic in nature, and their shapes are not intended to show the actual shapes of the regions of the device or limit the scope of the present application.

It may be noted that area of an object in the present application refers to area of orthographic projection of a surface of the object on an initial layout. That a slotted hole overlaps a metal connection line in the embodiments of the present application means that orthographic projection of a surface of the metal connection line on a power fill grid overlaps orthographic projection of a surface of the slotted hole on the power fill grid. That the slotted hole and the metal connection line are staggered in the embodiments of the present application means that the orthographic projection of the surface of the metal connection line on the power fill grid is staggered with the orthographic projection of the surface of the slotted hole on the power fill grid.

Referring to FIG. 1, the present application provides a method of repairing a layout, including:

Step S110: Obtain an initial layout of a semiconductor integrated circuit, wherein a metal connection line is formed on the initial layout.

Step S120: Form a power fill grid on the initial layout, wherein the power fill grid includes a slotted hole that overlaps orthographic projection of the metal connection line on the power fill grid, and the slotted hole includes a first section overlapping the metal connection line and at least one second section staggered with the metal connection line.

Step S130: Increase area of the second section if the area of the second section is less than a lower threshold, to form a repaired layout.

Specifically, the power fill grid with a first slotted hole is formed on the initial layout of the semiconductor integrated circuit, wherein the power fill grid includes the slotted hole that overlaps the orthographic projection of the metal connection line on the power fill grid, is and the slotted hole includes the first section overlapping the metal connection line and the at least one second section staggered with the metal connection line, so as to use the power fill grid to increase a width of the metal connection line. This effectively reduces a resistance value of the metal connection line. Because the power filled grid at least partially overlaps the metal connection line on the initial layout, an equivalent capacitor is formed in an overlapping region, which increases electrons stored in the power fill grid and improves mobility of the electrons on the power fill grid, thereby further reducing a voltage drop effect, reducing power consumption of a finished semiconductor device, and improving overall performance and reliability of the finished semiconductor device. In the present application, the area of the second section can be obtained in real time. If the area of the second section is less than the lower threshold, the area of the second section is increased to form the repaired layout, so as to avoid a physical verification error due to existence of a second section whose area is less than or equal to minimum area of a hole on the metal connection line. The fully automated layout repairing process effectively improves work efficiency of layout engineers and avoids mistakes in manual operations.

Figure 2:
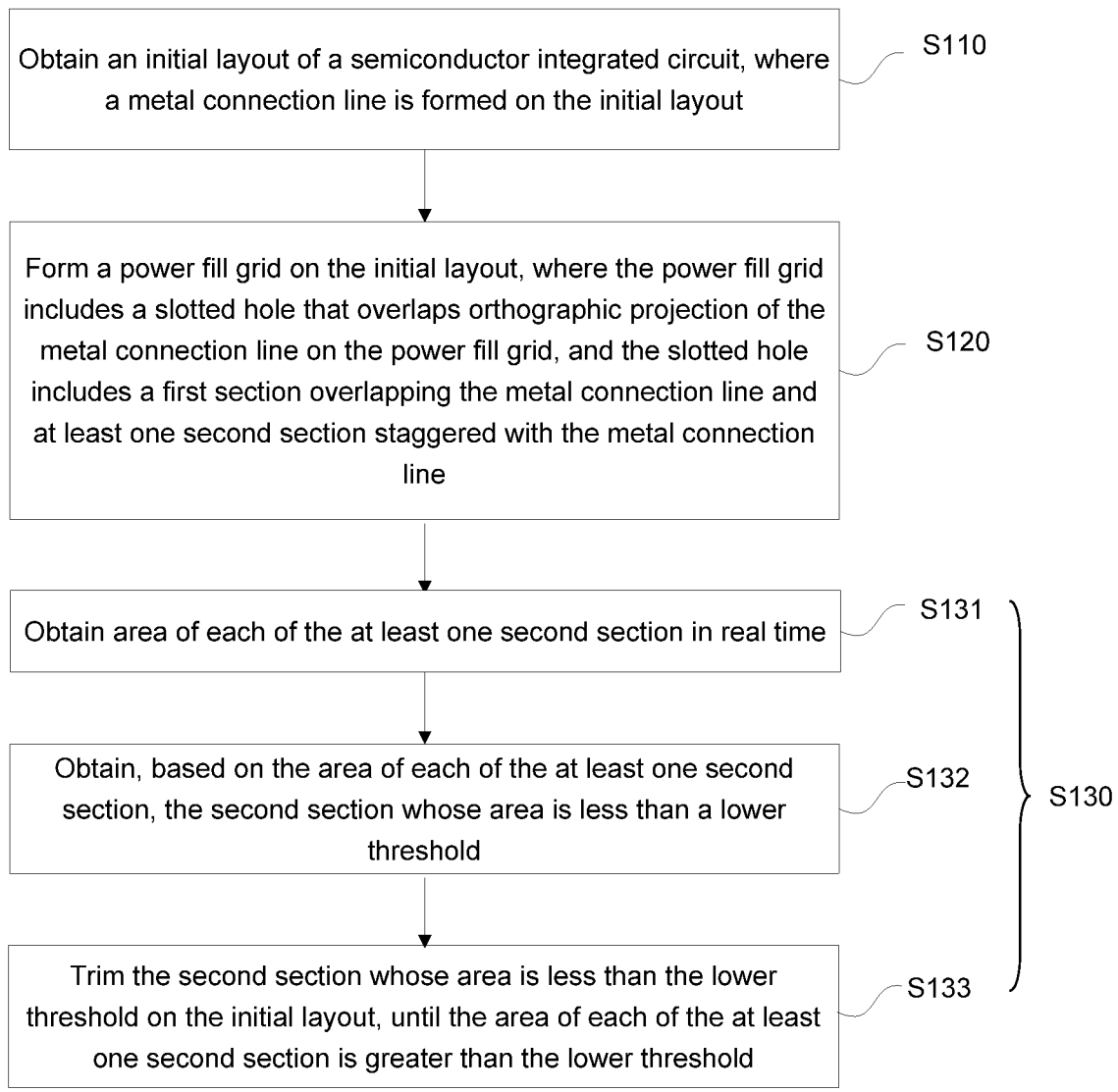
FIG. 2 is a flowchart of a method of repairing a layout according to another embodiment of the present application.

Further, referring to FIG. 2, in an embodiment of the present application, step S130 includes:

Step S131: Obtain area of each of the at least one second section in real time.

Step S132: Obtain, based on the area of each of the at least one second section, the second section whose area is less than the lower threshold.

Step S133: Trim the second section whose area is less than the lower threshold on the initial layout, until the area of each of the at least one second section is greater than the lower threshold.

Specifically, a metal grid line is generally used as the metal connection line on the initial layout to reduce impedance value of the metal connection line and reduce noise interference in a transmitted electrical signal. However, the power fill grid is added on the initial layout. The metal connection line on the initial layout includes a power metal connection line and a signal metal connection line. The power fill grid is electrically connected to the power metal connection line. The power fill grid includes the slotted hole overlapping with the orthographic projection of the metal connection line on a plane of the power fill grid, the slotted hole includes the first section overlapping the orthographic is projection of the metal connection line on the plane of the power fill grid and the at least one second section staggered with the orthographic projection of the metal connection line on the plane of the power fill grid, and there is a preset distance between the power fill grid and the signal metal connection line. If the area of the second section is less than the minimum area of the hole on the metal connection line on the initial layout, the physical verification error is caused, and subsequent manufacturing of a mask of the metal connection line is affected. The present application obtains the area of the second section on the initial layout of the semiconductor integrated circuit in real time, to obtain, based on the area of the second section, the second section whose area is less than the lower threshold, so as to trim the second section whose area is less than the lower threshold on the initial layout, until the area of the second section on the initial layout is greater than the lower threshold. The lower threshold is greater than or equal to the minimum area of the hole on the metal connection line on the initial layout, so as to avoid the physical verification error due to the existence of the second section whose area is less than or equal to the minimum area of the hole on the metal connection line, and improve quality of the subsequently manufactured mask of the metal connection line.

Further, still referring to FIG. 2, in an embodiment of the present application, the trimming the second section whose area is less than the lower threshold on the initial layout in step S133 includes: iteratively trimming the second section whose area is less than the lower threshold, wherein the area of the second section increases by preset area after each trimming. A trimming direction of the second section that needs to be trimmed can be determined, including a direction away from the metal connection line adjacent to the second section and/or a direction parallel to an extension direction of the metal connection line, and then the corresponding second section is trimmed based on the determined trimming direction, so as to avoid trimming a part of the metal connection line in a process of trimming the power fill grid to increase area of a trimmed second section. The second section whose area is less than or equal to the lower threshold on the initial layout is iteratively trimmed. During each trimming, a second section whose area is greater than the lower threshold is not trimmed, and the area of the second section increases by the preset area after the trimming. After a plurality of times of cyclic iterative trimming, the area of the second section on the initial layout is greater than the lower is threshold. In the repaired layout, at least one slotted hole includes two second sections on opposite sides of a metal connection line, so as to avoid the physical verification error due to the existence of the second section whose area is less than or equal to the minimum area of the hole on the metal connection line, and ensure that there are enough power fill grids on a trimmed layout, thereby reducing the power consumption of the finished semiconductor device, and improving the overall performance and reliability of the finished semiconductor device.

Figure 3:
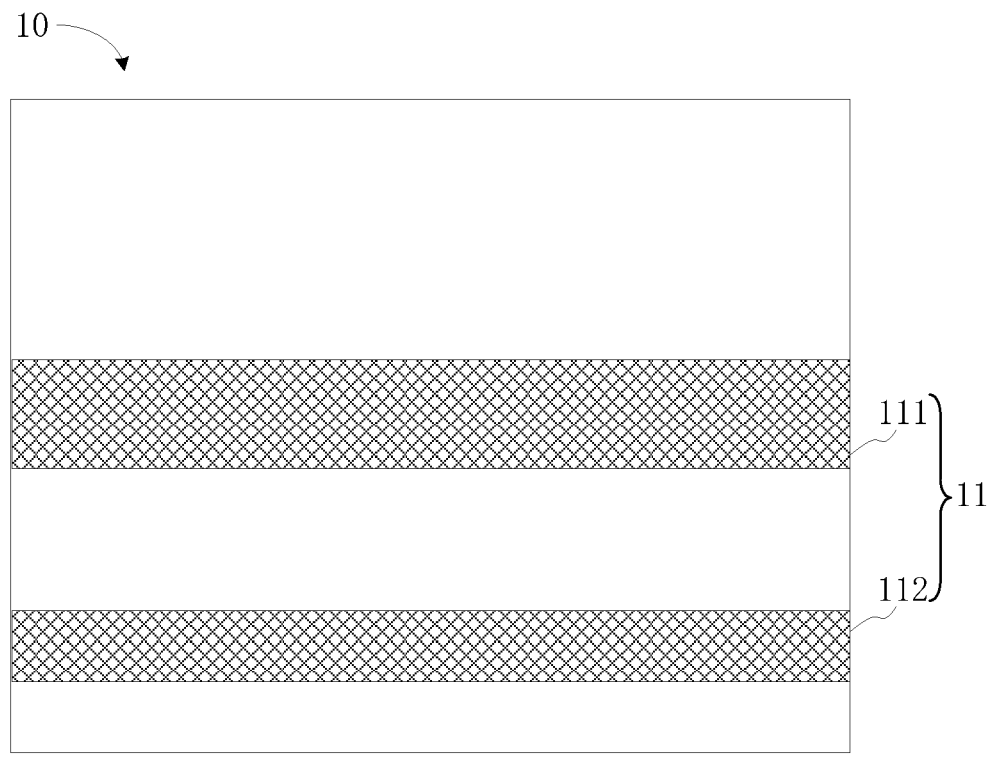
FIG. 3 schematically illustrates a top view of an initial layout obtained in step S110 according to an embodiment of the present application.

As an example, in step S110, referring to step S110 in FIG. 1 and FIG. 3, an initial layout 10 of a semiconductor integrated circuit is obtained, wherein a metal connection line 11 is formed on the initial layout 10. The metal connection line 11 may include a power metal connection line 111 and a signal metal connection line 112, a power fill grid (not shown in the figure) partially overlaps the power metal connection line 111, and there is a preset distance between the power fill grid and the signal metal connection line 112.

Figure 4A:
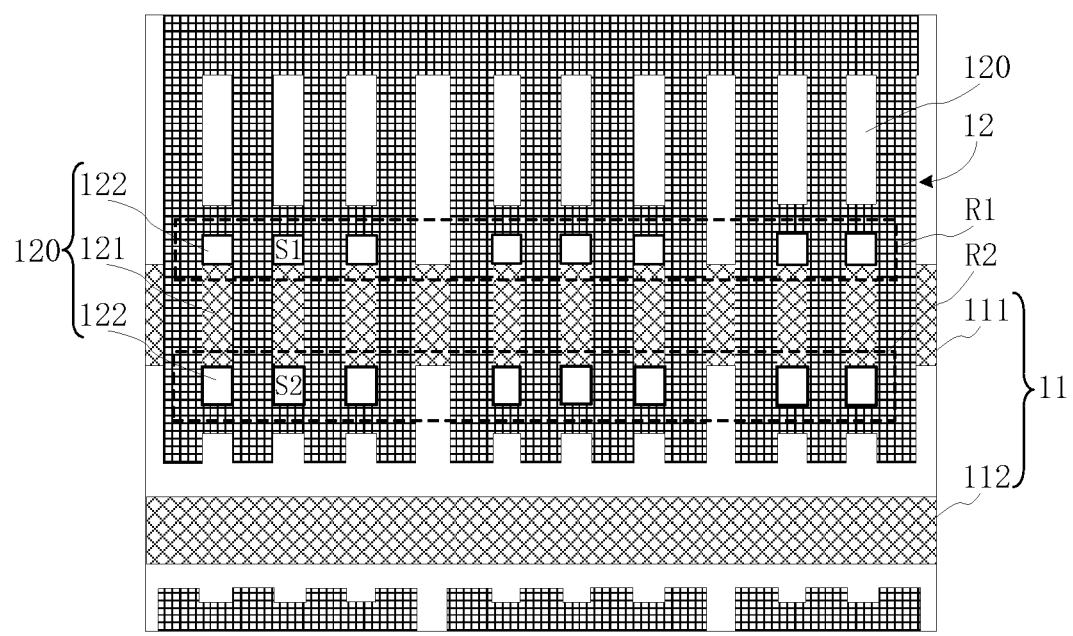
FIG. 4a schematically illustrates a top view of a layout obtained in step S120 according to an embodiment of the present application.

Further, in step S120, referring to step S120 in FIG. 1 and FIG. 4a, a metal grid line is generally used as the metal connection line 11 on the initial layout 10 to reduce an impedance value of the metal connection line 11 and reduce noise interference in a transmitted electrical signal. However, after the power fill grid is added on the initial layout 10, the power fill grid 12 is located above the power metal connection line 111 and electrically connected to the power metal connection line 111, so as to reduce resistance of the power metal connection line 111 and reduce an attenuation of a signal on the power metal connection line 111. The power fill grid 12 includes a slotted hole 120 that overlaps orthographic projection of the power metal connection line 111 on the power fill grid 12, and the slotted hole 120 includes a first section 121 overlapping the power metal connection line 111 and at least one second section 122 staggered with the power metal connection line 111. If area of the second section 122 is less than a lower threshold, a physical verification error is caused, and subsequent manufacturing of a mask of the metal connection line is affected.

Figure 4B:
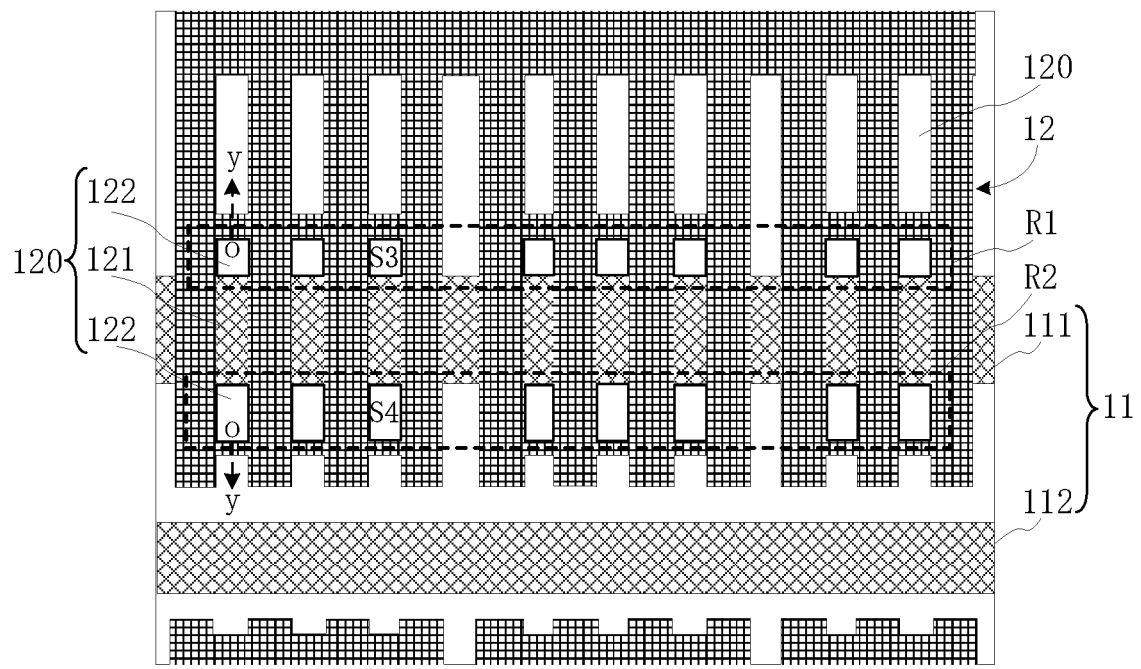
Figure 4C:
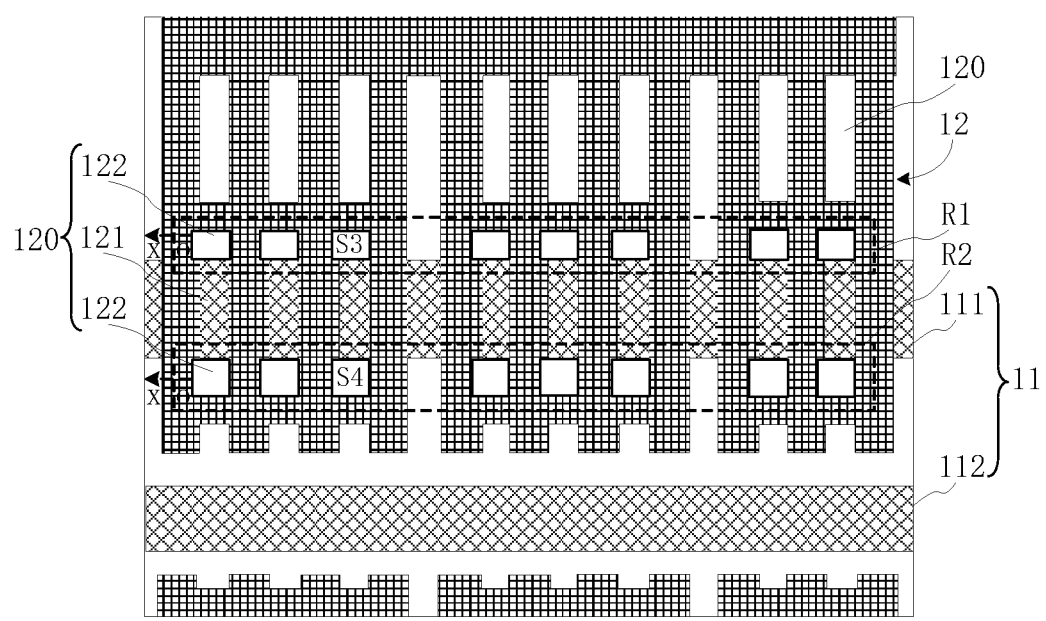
Figure 4D:
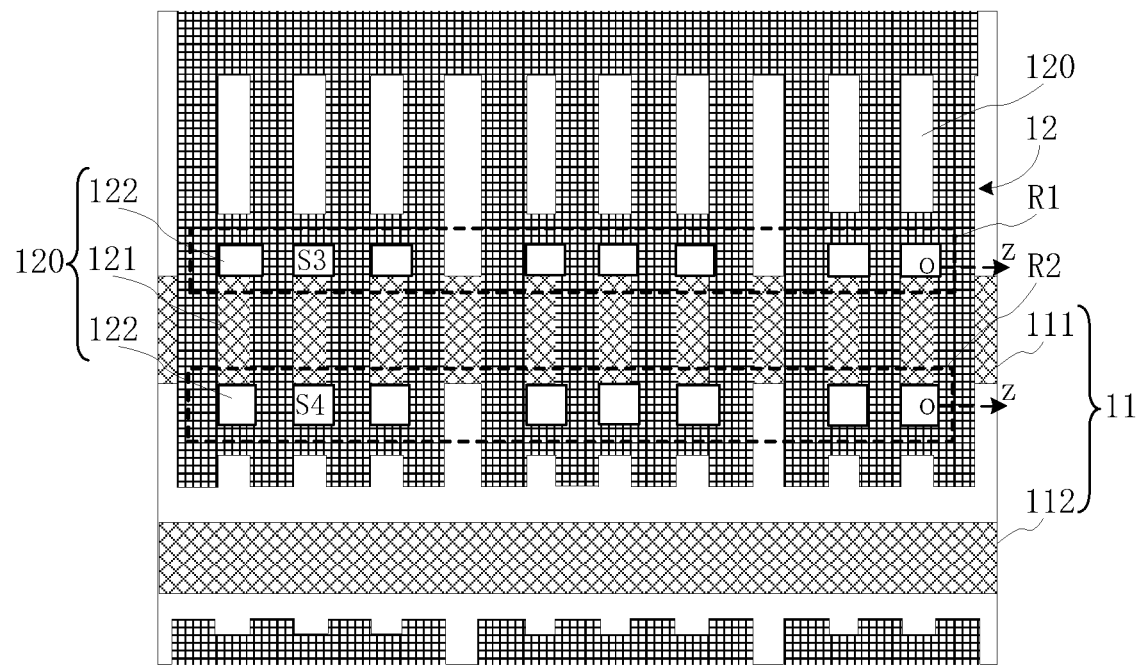

Further, in step S130, referring to step S130 in FIG. 1, FIG. 4b, FIG. 4c, and FIG. 4d, the present application obtains area of the second section 122 on the initial layout 10 of the semiconductor integrated circuit in real time, to obtain, based on the area of the second section 122, the second section 122 whose area is less than the lower threshold, so as to trim the second section 122 whose area is less than the lower threshold on the initial layout 10, until the area of the second section 122 on the initial layout 10 is greater than the lower threshold. The lower threshold is greater than or equal to minimum area of a hole on the metal connection line on the initial layout 10, so as to avoid the physical verification error due to existence of a second section 122 whose area is less than the minimum area of the hole on the metal connection line, and improve quality of the subsequently manufactured mask of the metal connection line. A trimming direction of the second section 122 that needs to be trimmed can be determined, including a direction away from the metal connection line 11 adjacent to the second section 122 and/or a direction parallel to an extension direction of the metal connection line 11, for example, an ox direction shown in FIG. 4b, an ox direction shown in FIG. 4c, or an oz direction shown in FIG. 4d, and then the second section 122 that needs to be trimmed is trimmed based on the determined trimming direction, so as to avoid trimming a part of the power metal connection line 111 in a process of trimming the power fill grid to increase area of a trimmed second section 122. It may be noted that the trimming directions shown in FIG. 4b, FIG. 4c, and FIG. 4d are intended to schematically illustrate an implementation principle of the present application. All trimming directions under the implementation principle should fall within the protection scope of the present application.

Figure 5:
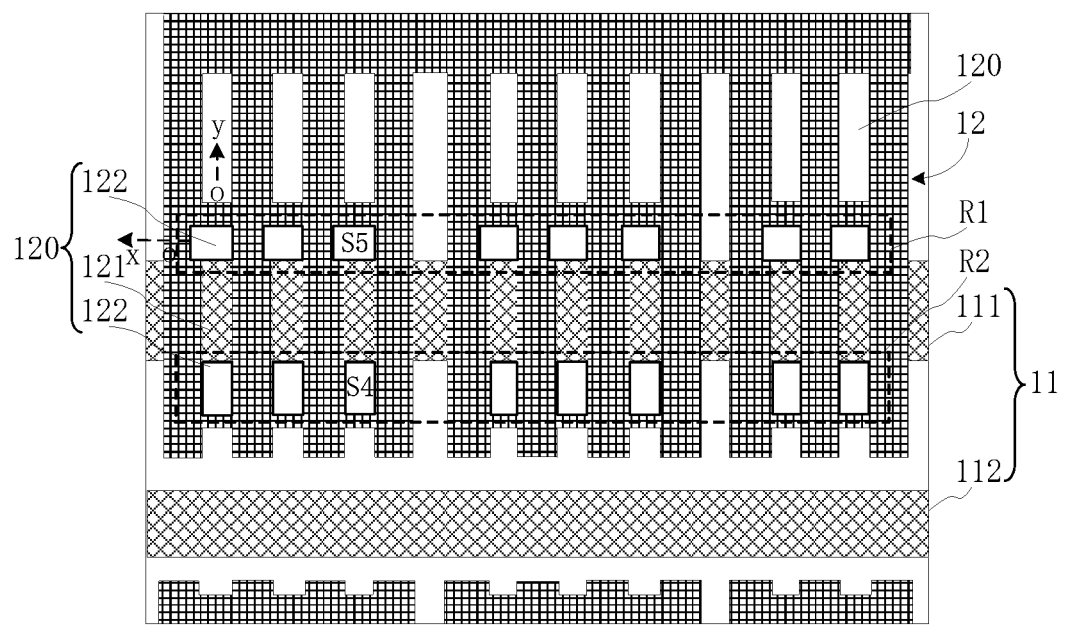

As an example, in step S130, still referring to step S130 in FIG. 1, FIG. 4a, FIG. 4b, FIG. 4c, FIG. 4d, and FIG. 5, the second section 122 whose area is less than or equal to the lower threshold on the initial layout 10 is iteratively trimmed. During each trimming, a second section 122 whose area is greater than the lower threshold is not trimmed, and the area of the second section 122 increases by preset area after the trimming. After a plurality of times of cyclic iterative trimming, the area of the second section 122 on the initial layout 10 is greater than the lower threshold. For example, area of a second section 122 of row R1 in FIG. 4a is S1, area of a second section 122 of row R2 is S2, both S1 and S2 are less than or equal to the lower threshold, and the lower threshold is greater than or equal to the minimum area of the hole on the metal connection line 11 on the initial layout 10. In this case, the second section 122 with the area of S1 in row R1 and the second section 122 with the area of S2 in row R2 in FIG. 4a can be trimmed along any one of the ox direction, the oy direction, or the oz direction, such that area of a trimmed second section 122 of row R1 increases by the preset area and reaches S3, and area of a trimmed second section 122 of row R2 increases by the preset area and reaches S4. S4 is greater than the lower threshold and S3 is less than or equal to the lower threshold. Taking a trimmed layout in FIG. 4c as an example, the second section 122 with the area of S3 in row R1 in FIG. 4c is continuously trimmed along the oy direction shown in FIG. 5, and the second section 122 with the area of S4 in row R2 in FIG. 4c is not trimmed, such that the area of the second section 122 with the area of S3 in row R1 in FIG. 4c increases by the preset area after the trimming and reach S5. In this way, a layout shown in FIG. 5 is obtained, wherein both the area S4 of the second section 122 in row R2 and the area S5 of the second section 122 in row R1 are greater than the lower threshold. In a repaired layout, at least one slotted hole 120 includes two second sections 122 located on opposite sides of one metal connection line 11, to avoid the physical verification error due to the existence of the second section 122 whose area is less than the minimum area of the hole on the metal connection line, and ensure that there are enough power fill grids 12 on the trimmed layout.

Figure 6:
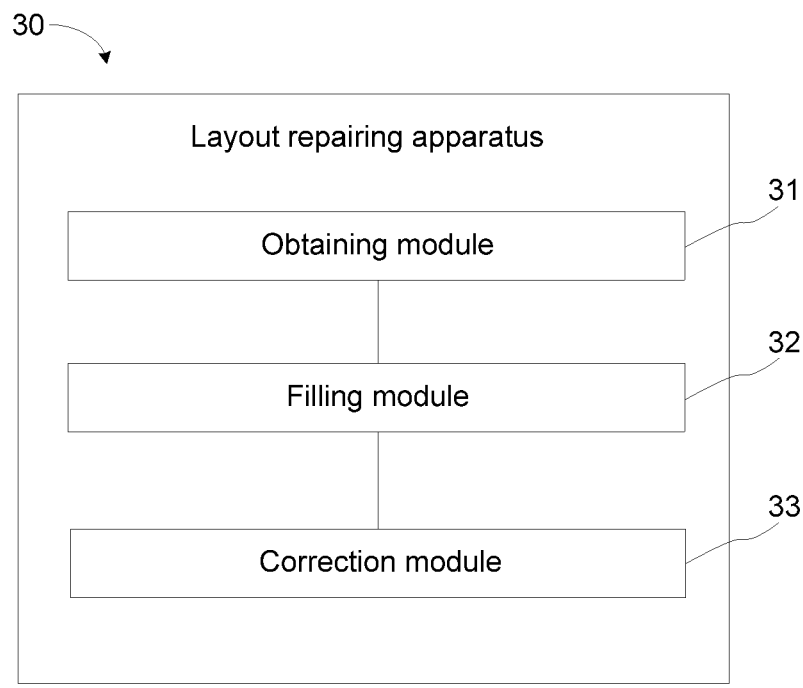
FIG. 6 is a structural block diagram of a layout repairing apparatus according to an embodiment of the present application.

Further, referring to FIG. 6, in an embodiment of the present application, a layout repairing apparatus 30 is provided, including an obtaining module 31, a filling module 32, and a correction module 33, wherein the obtaining module 31 is configured to obtain an initial layout 10 of a semiconductor integrated circuit, and a metal connection line is formed on the initial layout 10; the filling module 32 is configured to form a power fill grid 12 on the initial layout 10, wherein the power fill grid 12 includes a slotted hole 120 that overlaps orthographic projection of the metal connection line 11 on the power fill grid 12, and the slotted hole 120 includes a first section 121 overlapping the metal connection line 11 and at least one second section 122 staggered with the metal connection line 11; and the correction module 33 is configured to increase area of the second section 122 if the area of the second section 122 is less than a lower threshold, to form a repaired layout.

Figure 7:
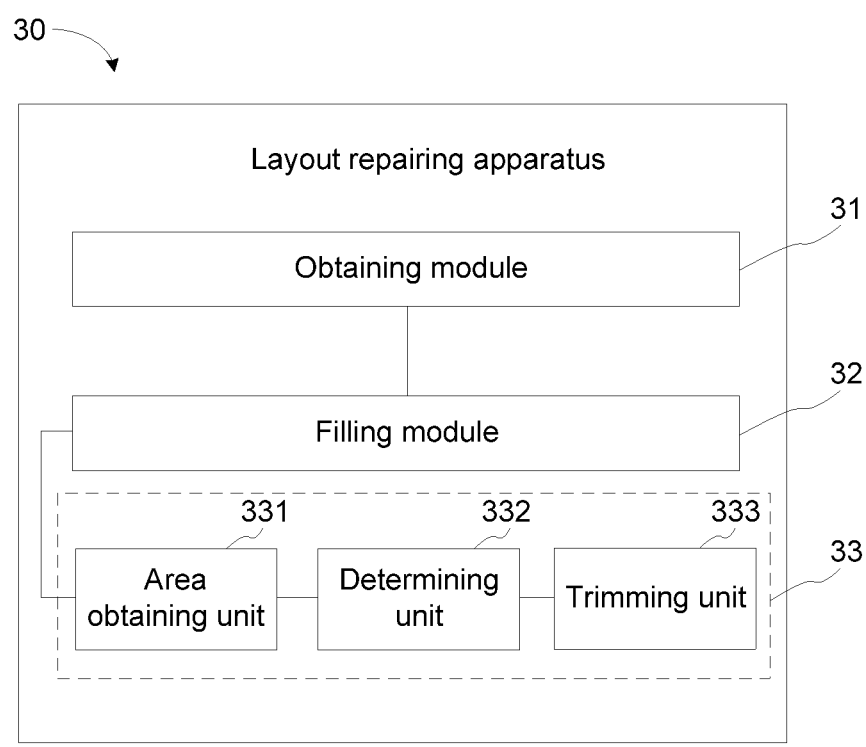
FIG. 7 is a structural block diagram of a layout repairing apparatus according to another embodiment of the present application.

Further, referring to FIG. 7, in an embodiment of the present application, the correction module 33 includes an area obtaining unit 331, a determining unit 332, and a trimming unit 333, wherein the area obtaining unit 331 is configured to obtain area of the second section 122 in real time; the determining unit 332 is configured to obtain, based on the area of the second section 122, the second section 122 whose area is less than is the lower threshold; and the trimming unit 333 is configured to trim the second section 122 whose area is less than the lower threshold on the initial layout 10, until the area of the second section 122 is greater than the lower threshold.

As an example, still referring to FIG. 7, the trimming unit 333 iteratively trims the second section 122 whose area is less than the lower threshold, wherein the area of the second section 122 increases by preset area after each trimming.

Figure 8:
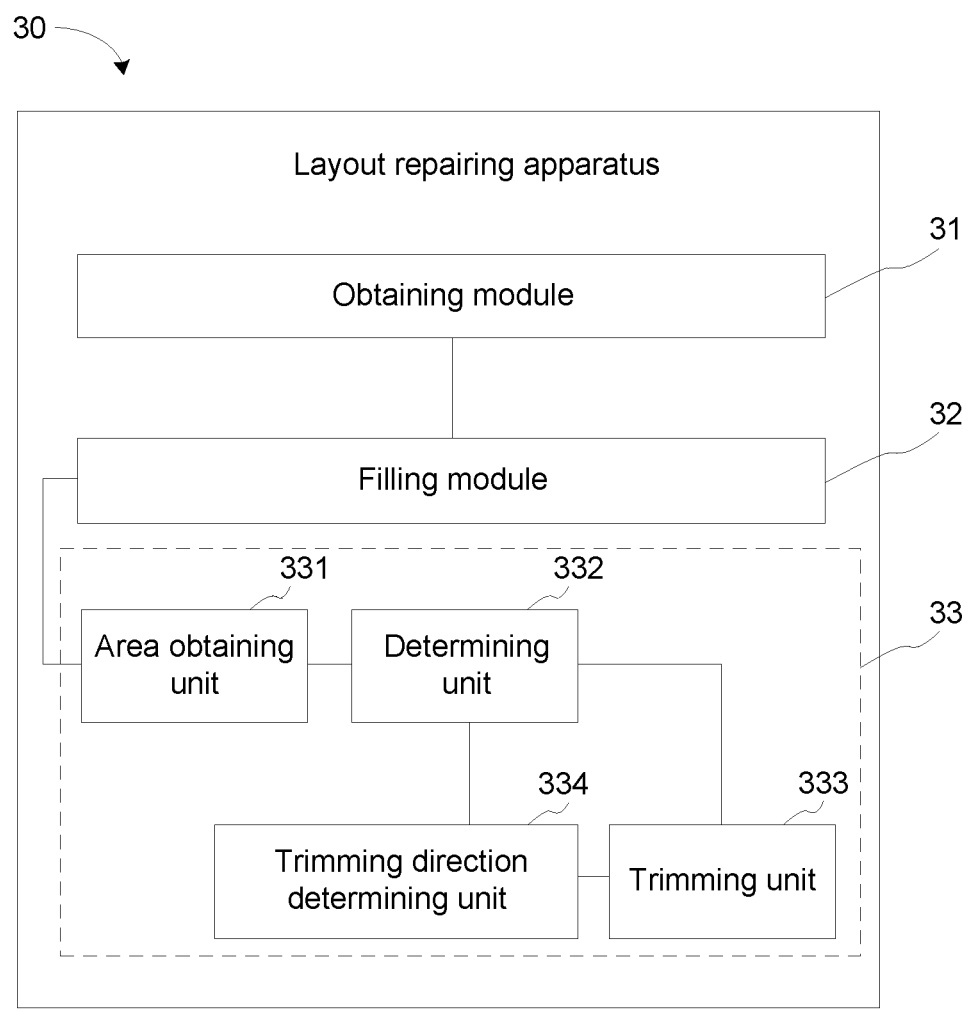
FIG. 8 is a structural block diagram of a layout repairing apparatus according to still another embodiment of the present application.

Further, referring to FIG. 8, in an embodiment of the present application, the correction module 33 further includes a trimming direction determining unit 334. The trimming direction determining unit 334 is configured to determine, based on the initial layout 10 on which the power fill grid 12 is formed, a trimming direction of the second section 122 that needs to be trimmed; and the trimming unit 333 trims, based on the trimming direction, the second section 122 that needs to be trimmed.

A metal grid line is generally used as the metal connection line 11 on the initial layout 10 to reduce impedance value of the metal connection line 11 and reduce noise interference in a transmitted electrical signal. Therefore, the metal connection line 11 is formed on the initial layout 10. The metal connection line 11 may include a power metal connection line 111 and a signal metal connection line 112. However, after the filling module 32 adds the power fill grid on the initial layout 10, the power fill grid 12 includes the slotted hole 120 that overlaps the orthographic projection of the metal connection line 11 on the power fill grid 12, and the slotted hole 120 includes the first section 121 overlapping the metal connection line 11 and the at least one second section 122 staggered with the metal connection line 11. If the area of the second section 122 is less than minimum area of a hole on the metal connection line on the initial layout, a physical verification error is caused, and subsequent manufacturing of a mask of the metal connection line is affected. The present application obtains the area of the second section 122 on the initial layout 10 of the semiconductor integrated circuit in real time by using the correction module 33, to obtain, based on the area of the second section 122, the second section 122 whose area is less than the lower threshold, so as to trim the second section 122 whose area is less than the lower threshold on the initial layout 10, until the area of the second section 122 on the initial layout is greater than the lower threshold. The lower threshold is greater than or equal to the minimum area of the hole on the metal is connection line on the initial layout 10, so as to avoid the physical verification error due to existence of a second section 122 whose area is less than the minimum area of the hole on the metal connection line, and improve quality of the subsequently manufactured mask of the metal connection line. The trimming direction of the second section 122 that needs to be trimmed can be determined based on the trimming direction determining unit 334, including a direction away from the metal connection line 11 adjacent to the second section 122 and/or a direction parallel to an extension direction of the metal connection line 11, for example, an ox direction shown in FIG. 4b, an ox direction shown in FIG. 4c, or an oz direction shown in FIG. 4d, and then the corresponding second section 122 that needs to be trimmed is trimmed based on the determined trimming direction, so as to avoid trimming a part of the metal connection line in a process of trimming the power fill grid 12 to increase area of a trimmed second section 122. It may be noted that the trimming directions shown in FIG. 4b, FIG. 4c, and FIG. 4d are intended to schematically illustrate an implementation principle of the present application. All trimming directions under the implementation principle should fall within the protection scope of the present application.

Figure 9:
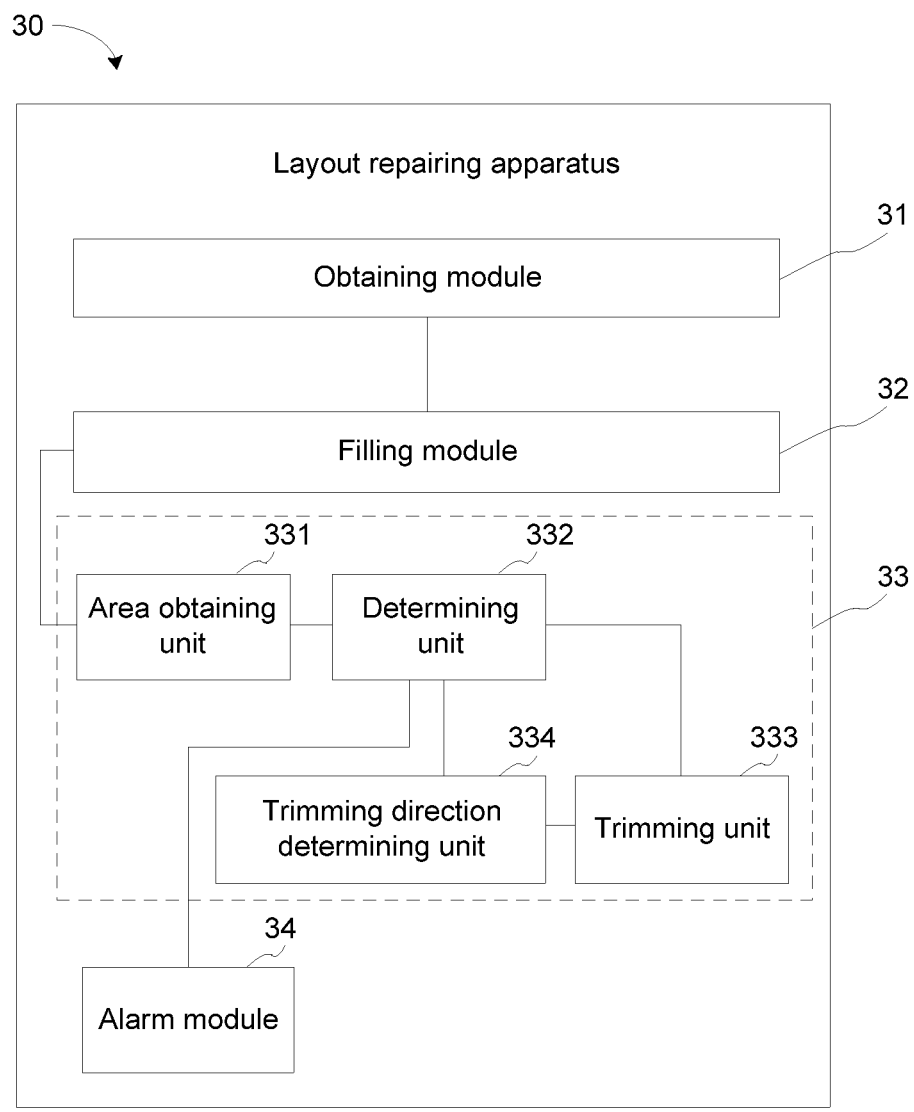
FIG. 9 is a structural block diagram of a layout repairing apparatus according to yet another embodiment of the present application.

Further, referring to FIG. 9, in an embodiment of the present application, the layout repairing apparatus 30 further includes an alarm module 34. The alarm module 34 is configured to output alarm information when the area of the second section 122 is less than the lower threshold, and remind relevant staff in a timely manner that there is a second section 122 that needs to be trimmed.

Further, in an embodiment of the present application, a computer device is provided, including a memory and a processor, wherein the memory stores a computer program, and the computer program is executed by the processor to implement the method according to any one of the embodiments described above.

Further, in an embodiment of the present application, a computer-readable storage medium is provided, wherein the computer-readable storage medium stores a computer program, and the computer program is executed by a processor to implement the method according to any one of the embodiments described above.

In the above layout repairing method and apparatus, computer device, and storage medium, the power fill grid with a first slotted hole is formed on the initial layout of the is semiconductor integrated circuit, wherein the power fill grid includes the slotted hole that overlaps the orthographic projection of the metal connection line on the power fill grid, and the slotted hole includes the first section overlapping the metal connection line and the at least one second section staggered with the metal connection line, so as to use the power fill grid to increase a width of the metal connection line. This effectively reduces a resistance value of the metal connection line. Because the power filled grid at least partially overlaps the metal connection line on the initial layout, an equivalent capacitor is formed in an overlapping region, which increases electrons stored in the power fill grid and improves mobility of the electrons on the power fill grid, thereby further reducing a voltage drop effect. In the embodiments, the area of the second section can be obtained in real time. If the area of the second section is less than the lower threshold, the area of the second section is increased to form the repaired layout, so as to avoid a physical verification error due to existence of a second section whose area is less than minimum area of a hole on the metal connection line, reduce power consumption of a finished semiconductor device, and improve overall performance and reliability of the finished semiconductor device. The fully automated layout repairing process effectively improves work efficiency of layout engineers and avoids mistakes in manual operations.

It should be understood that although the steps in the flowcharts of FIG. 1 and FIG. 2 are shown in turn as indicated by arrows, these steps are not necessarily performed in turn as indicated by the arrows. Unless clearly described otherwise, the execution order of the steps is not strictly limited, and the steps may be executed in other orders. Moreover, at least some of the steps in FIG. 1 and FIG. 2 may include a plurality of substeps or stages. The substeps or stages are not necessarily executed at the same time, but may be executed at different times. The execution order of the substeps or stages is not necessarily carried out sequentially, but may be executed alternately with other steps or at least some of the substeps or stages of other steps.

Those of ordinary skill in the art can understand that all or part of the processes of realizing the method in the above embodiments can be completed by a computer program instructing relevant hardware. The computer program may be stored in a non-volatile computer-readable storage medium. When the computer program is executed, the processes of the above method embodiments are performed. Any reference to a memory, is a storage device, a database, or other media used in the embodiments of the present application may include a non-volatile and/or volatile memory. The non-volatile memory may include a read-only memory (ROM), a magnetic tape, a floppy disk, a flash memory, or an optical memory. The volatile memory may include a random access memory (RAM) or an external cache memory. As an illustration rather than a limitation, the RAM may be in various forms, such as a static random access memory (SRAM) or a dynamic random access memory (DRAM).

Figure 10:
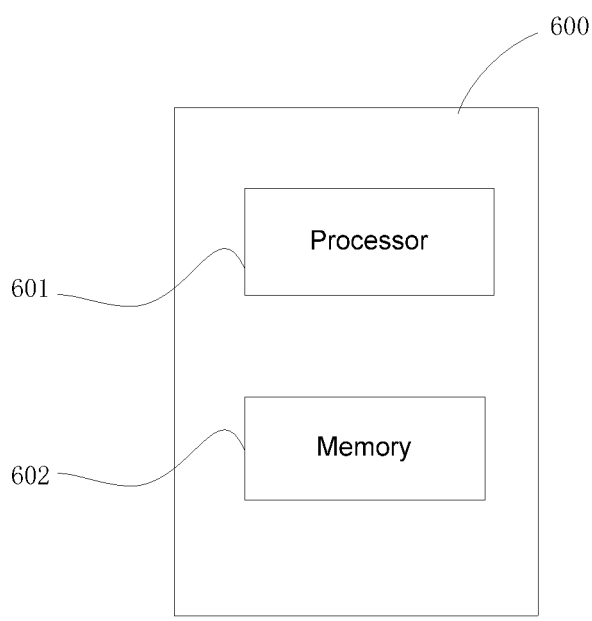
FIG. 10 is a block diagram of a layout repairing apparatus according to an exemplary embodiment.

An exemplary embodiment of the present disclosure provides a layout repairing apparatus. Referring to FIG. 10, the layout repairing apparatus 600 may be provided as a terminal device. The layout repairing apparatus 600 may include a processor 601, and one or more processors may be set as required. The layout repairing apparatus 600 may further include a memory 602 configured to store an executable instruction, such as an application program, of the processor 601. One or more memories may be set as required. The memory may store one or more application programs. The processor 601 is configured to execute the instruction to perform the foregoing method.

Persons skilled in the art should understand that the embodiments of the present disclosure may be provided as a method, an apparatus (device), or a computer program product. Therefore, the present disclosure may use a form of hardware only examples, software only examples, or examples with a combination of software and hardware. Moreover, the present disclosure may be in a form of a computer program product that is implemented on one or more computer-usable storage media that include computer-usable program code. The computer storage media include volatile and non-volatile, removable and non-removable media implemented in any method or technology for storing information (such as computer-readable instructions, data structures, program modules, or other data), including but not limited to, a RAM, a ROM, an EEPROM, a flash memory or other storage technologies, a CD-ROM, a digital versatile disk (DVD) or other optical disc storage, a magnetic cassette, a magnetic tape, magnetic disk storage or other magnetic storage apparatuses, or any other medium that can be used to store desired information and can be accessed by a computer. In addition, as is well known to persons of ordinary skill in the art, the communication media usually contain computer-readable instructions, data structures, program modules, or other data in modulated data signals such as carrier waves or other transmission mechanisms, and may include any information transfer medium.

In an exemplary embodiment, a non-transitory computer-readable storage medium including instructions is provided. Referring to FIG. 10, for example, the non-transitory computer-readable storage medium may be the memory 602 including instructions. The foregoing instructions may be executed by the processor 601 of the layout repairing apparatus 600 to complete the foregoing method. For example, the non-transitory computer-readable storage medium may be a ROM, a RAM, a CD-ROM, a magnetic tape, a floppy disk, an optical data storage device, or the like.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

The technical characteristics of the above embodiments may be employed in arbitrary combinations. To provide a concise description of these embodiments, all possible combinations of all the technical characteristics of the embodiments may not be described; however, these combinations of the technical characteristics should be construed as falling within the scope defined by the specification as long as no contradiction occurs.

Only several implementations of the present application are described in detail in the above embodiments, but they should not therefore be construed as limiting the scope of the present application. It should be noted that those of ordinary skill in the art can further make variations and improvements without departing from the conception of the present application. These variations and improvements all fall within the protection scope of the present application. Therefore, the protection scope of the present disclosure should be subject to the protection scope defined by the claims.

The invention claimed is:

1. A method of repairing a layout, comprising:
    obtaining an initial layout of a semiconductor integrated circuit, wherein a metal connection line is formed on the initial layout;
    forming a power fill grid on the initial layout, wherein the power fill grid comprises a slotted hole that overlaps orthographic projection of the metal connection line on the power fill grid, and the slotted hole comprises a first section overlapping the metal connection line and at least one second section staggered with the metal connection line; and
    increasing area of the second section when the area of the second section is less than a lower threshold, to form a repaired layout.

2. The method of repairing a layout according to claim 1, wherein the increasing area of the second section when the area of the second section is less than a lower threshold comprises:
    obtaining area of each of the at least one second section in real time;
    obtaining, based on the area of each of the at least one second section, the second section whose area is less than the lower threshold; and
    trimming the second section whose area is less than the lower threshold on the initial layout, until the area of each of the at least one second section is greater than the lower threshold.

3. The method of repairing a layout according to claim 2, wherein the trimming the second section whose area is less than the lower threshold on the initial layout comprises: iteratively trimming the second section whose area is less than the lower threshold, wherein the area of the second section increases by preset area after each trimming.

4. The method of repairing a layout according to claim 2, before the trimming the second section whose area is less than the lower threshold on the initial layout, the method further comprises: determining, based on the initial layout on which the power fill grid is formed, a trimming direction of the second section that needs to be trimmed; and
    trimming, based on the trimming direction, the second section whose area is less than the lower threshold on the initial layout.

5. The method of repairing a layout according to claim 4, wherein the trimming direction comprises a direction away from the metal connection line adjacent to the second section and/or a direction parallel to an extension direction of the metal connection line.

6. The method of repairing a layout according to claim 4, wherein in the repaired layout, at least one slotted hole comprises two second sections located on opposite sides of one metal connection line.

7. The method of repairing a layout according to claim 1, further comprising:
    outputting alarm information when the area of the second section is less than the lower threshold.

8. The method of repairing a layout according to claim 1, wherein the metal connection line comprises a power metal connection line and a signal metal connection line, the power fill grid partially overlaps the power metal connection line, and there is a preset distance between the power fill grid and the signal metal connection line.

9. A non-transitory computer-readable storage medium, wherein the computer-readable storage medium stores a computer program, and the computer program is executed by a processor to implement the method according to claim 1.

10. A layout repairing apparatus, comprising:
    one or more processors; and
    a storage apparatus, configured to store one or more programs, wherein the one or more programs, when executed by the one or more processors, cause the one or more processors to execute operations of:
    obtaining an initial layout of a semiconductor integrated circuit, wherein a metal connection line is formed on the initial layout;
    forming a power fill grid on the initial layout, wherein the power fill grid comprises a slotted hole that overlaps orthographic projection of the metal connection line on the power fill grid, and the slotted hole comprises a first section overlapping the metal connection line and at least one second section staggered with the metal connection line; and increasing area of the second section when the area of the second section is less than a lower threshold, to form a repaired layout.

11. The layout repairing apparatus according to claim 10, wherein the one or more programs further cause the one or more processors to execute operations of:

obtaining area of each of the at least one second section in real time;

obtaining, based on the area of each of the at least one second section, the second section whose area is less than the lower threshold; and trimming the second section whose area is less than the lower threshold on the initial layout, until the area of each of the at least one second section is greater than the lower threshold.

12. The layout repairing apparatus according to claim 11, wherein the one or more programs further cause the one or more processors to execute operations of: iteratively trimming the second section whose area is less than the lower threshold, wherein the area of the second section increases by preset area after each trimming.

13. The layout repairing apparatus according to claim 11, wherein the one or more programs further cause the one or more processors to execute operations of: determining, based on the initial layout on which the power fill grid is formed, a trimming direction of the second section that needs to be trimmed; and trimming the corresponding second section based on the trimming direction.

14. The layout repairing apparatus according to claim 10, the one or more programs further cause the one or more processors to execute operations of:

outputting alarm information when the area of the second section is less than the lower threshold.

15. The layout repairing apparatus according to claim 10, wherein the metal connection line comprises a power metal connection line and a signal metal connection line, the power fill grid partially overlaps the power metal connection line, and there is a preset distance between the power fill grid and the signal metal connection line.

* * * * *